United States Patent [19]

Kahn

[11] Patent Number: 4,580,279

[45] Date of Patent: Apr. 1, 1986

[54] ELASTIC STORE SLIP CONTROL AND MAINTENANCE CIRCUIT

[75] Inventor: David B. Kahn, Old Bridge, N.J.

[73] Assignee: AT&T Bell Laboratories, Murray Hill, N.J.

[21] Appl. No.: 600,797

[22] Filed: Apr. 16, 1984

[51] Int. Cl.[4] .............................................. H04L 25/36
[52] U.S. Cl. ..................................... 375/118; 370/102; 371/51
[58] Field of Search ....................... 375/106, 102, 118; 371/49, 50, 51; 370/100, 102

[56] References Cited

U.S. PATENT DOCUMENTS

| | | | |
|---|---|---|---|
| 3,867,579 | 2/1975 | Colton et al. | 179/15 |
| 4,045,613 | 8/1977 | Walker | 370/102 |
| 4,049,910 | 9/1977 | Jolivet et al. | 370/102 |
| 4,107,469 | 8/1978 | Jenkins | 370/102 |
| 4,187,394 | 2/1980 | Sievers | 375/118 |
| 4,346,474 | 8/1982 | Sze | 371/49 |

Primary Examiner—Robert L. Griffin
Assistant Examiner—Stephen Chin
Attorney, Agent, or Firm—Thomas Stafford

[57] ABSTRACT

In an elastic store synchronization system, failures in the slip control circuitry or the elastic store itself are determined by employing a slip maintenance circuit. To this end, parity written into the elastic store is scrambled in a prescribed manner. The slip maintenance circuit generates signals for unscrambling the read parity from the elastic store when no slip is present and to compensate the read parity in the presence of slips so that the appropriate system parity is obtained. Any resulting parity violations indicate a failure of the slip control circuitry or of the elastic store.

11 Claims, 8 Drawing Figures

FIG. 1

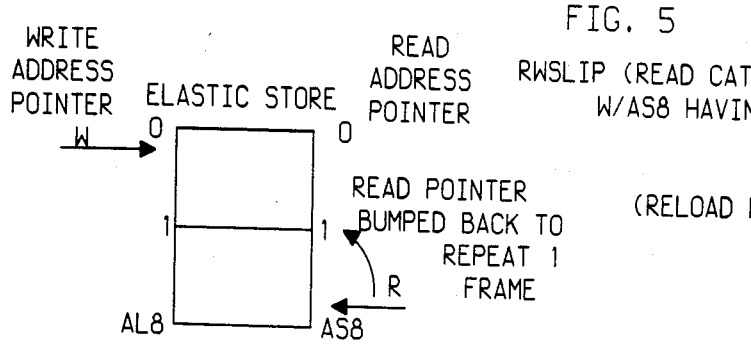
FIG. 5 RWSLIP (READ CATCH WRITE SLIP) W/AS8 HAVING BEEN 1
(RELOAD REVEN)
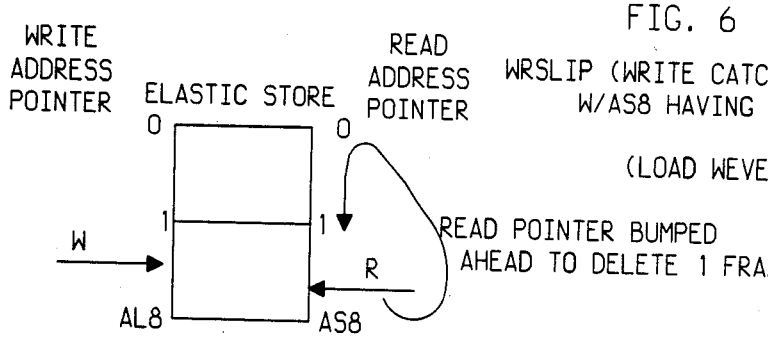
FIG. 6 WRSLIP (WRITE CATCH READ SLIP) W/AS8 HAVING BEEN 1
(LOAD WEVEN)
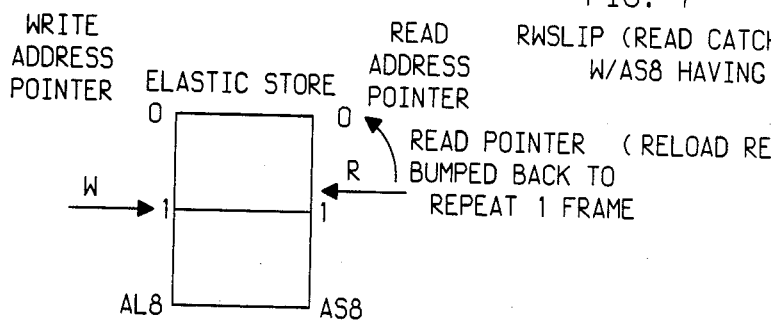
FIG. 7 RWSLIP (READ CATCH WRITE SLIP) W/AS8 HAVING BEEN 0
(RELOAD REVEN)
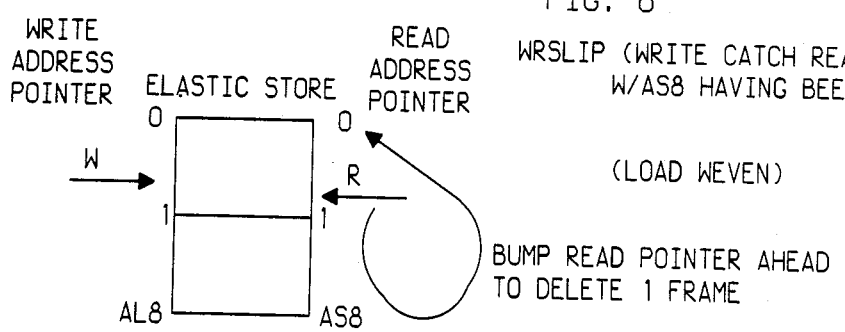
FIG. 8 WRSLIP (WRITE CATCH READ SLIP) W/AS8 HAVING BEEN 0
(LOAD WEVEN)

ELASTIC STORE SLIP CONTROL AND MAINTENANCE CIRCUIT

TECHNICAL FIELD

This invention relates to elastic store arrangements and, more particularly, to slip control and maintenance of the elastic store.

BACKGROUND OF THE INVENTION

In data transmission systems, each terminal of a transmission link is provided with a clock source for obtaining the timing operations at that terminal. At a transmitting terminal, the local clock generates timing signals to align outgoing data bits in appropriate time slots, assemble the time slots into frames and control the insertion of other signals required in the transmission of the data. At a receiving terminal, the local clock similarly generates timing signals for the recovery of the received data.

To accomplish these functions, the incoming data must be synchronized to the receiving terminal clock. This has been realized by employing a so-called elastic store arrangement. An elastic store typically includes a pair of data stores and successive frames of incoming data are alternately written into the data stores using recovered incoming line timing. The data is alternately read out of the data stores at the receiving terminal timing rate. The data read out is generally phase shifted with respect to data write in so that the write in to one data store occurs simultaneously with the read out of the other data store. However, the recovered line timing to write the received data into the stores for a given line is not necessarily synchronized to the receiving terminal timing and, as a result, more or less data can be written into the stores than is read out of them, causing an overflow or depletion of the stores. To deal with this problem, a "slip" control circuit is used to compare the read and write cycles and when the read cycle effectively drifts or phase shifts to a predetermined extent in either direction relative to the write cycle, the slip control circuit operates on the ready cycle to discard a frame of data or to re-read a frame of data, depending on the relative direction of the phase shift between the read and write cycles. On such elastic store slip control circuit is disclosed in U.S. Pat. No. 3,867,579 issued to J. R. Colton et al on Feb. 18, 1975.

One problem with the prior slip control circuit is that it could not be tested, i.e., exercised, without disrupting transmission of data. Another problem with the prior slip control circuit is that if it failed there were no provisions for indicating the failures and transmission errors would result.

SUMMARY OF THE INVENTION

These and other problems of prior elastic store slip control circuits are overcome, in accordance with an aspect of the invention, by employing a so-called slip maintenance circuit including a slip detector for maintaining the slip control circuit without a need to exercise it. To this end, the parity of the data being written into the elastic store is controllably scrambled and, then, the parity of the data being read out is controllably unscrambled to obtain the parity of the transmitted data. When a frame slip occurs and is detected, the parity of the data being read out of the elastic store is controllably compensated so that parity errors do not occur in the output data. However, when there are failures of the elastic store address information or data, if the slip detector failed to detect a slip, or if the slip maintenance circuitry fails, the parity of the elastic store data being read out is not compensated and parity errors result. These parity errors indicate that either the elastic store or the slip control circuit has failed.

BRIEF DESCRIPTION OF THE DRAWING

The invention will be more fully understood from the following detailed description of an illustrative embodiment taken in connection with the appended figures in which:

FIG. 1 shows in simplified block diagram form an elastic store slip control and maintenance circuit including an embodiment of the invention;

FIGS. 5 through 8 show a number of graphical representations useful in describing the action taken when frame slips occur and are detected.

DETAILED DESCRIPTION

Figure 1:
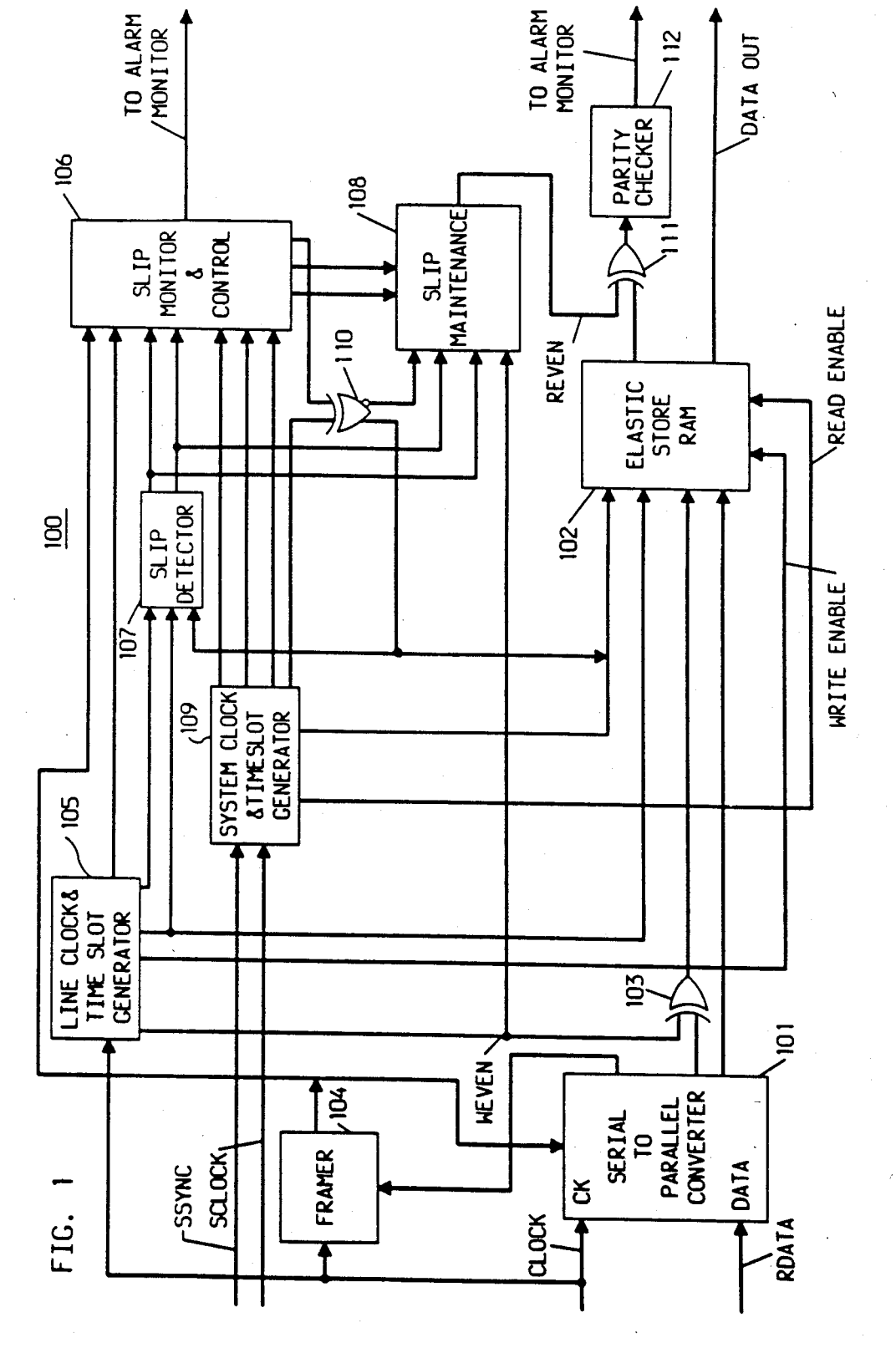
Figure 2:
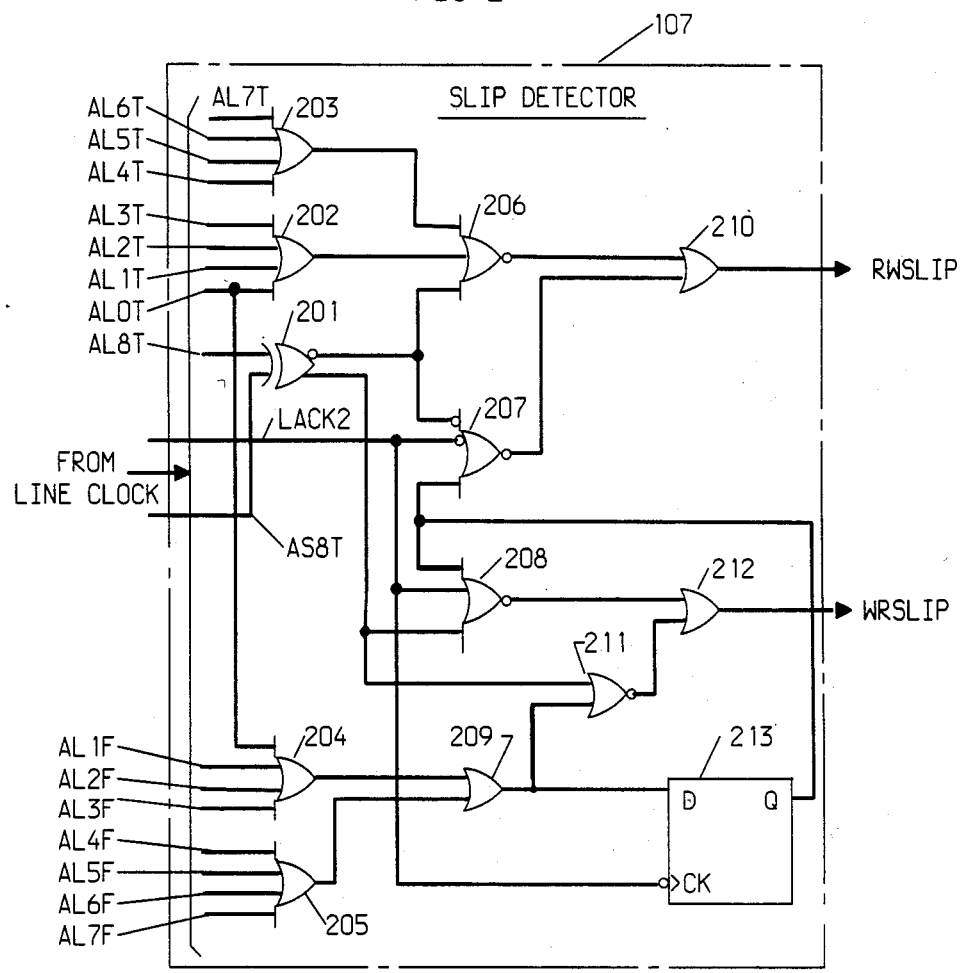
FIG. 2 depicts details of the slip detector used in FIG. 1.

Slip control and maintenance circuit 100 including an embodiment of the invention is shown in simplified block diagram form in FIG. 1. Accordingly, incoming data RDATA which is in serial form at a rate CLOCK, in this example 32.768 megabits per second, is supplied to serial to parallel converter 101. RDATA includes, in this example, 256 time slots of data per frame, namely, 0–255, with 16 bits per time slot, 8 of which are PCM data. Bits 0 to 14 from converter 101 are supplied to a write input of elastic store RAM 102. Bit 15 which is the parity bit is supplied to one input of Exclusive OR gate 103. Converter 101 also performs a comparison of its output for a predetermined framing pattern in well known fashion.

Elastic store RAM 102 can be any one of known read write memory units and in this example it has 512 memory locations. The 512 memory locations are used to store two frames of incoming data, i.e., 2 frames of 256 times slots each. Thus, elastic store RAM 102 is considered to comprise first and second data stores.

Frame 104 is supplied with CLOCK and the result of the comparison of the output from serial to parallel converter 101 to the predetermined framing pattern, and checks in well-known fashion to determine if the incoming data is in frame synchronization. If two or more out of the last four frames have framing errors, an out of frame condition is declared and a disable output is generated which is supplied to serial to parallel converter 101, line clock and time slot generator 105, and slip monitor and control 106. The disable output from framer 104 disables line clock and time slot generator 105 until an in-frame condition is again obtained. This freezes the address and other outputs from line clock and time slot generator 105 until the in-frame condition is obtained. This is obtained, in this example, after 8 consecutive frames having no framing errors are detected.

Line clock and time slot generator 105 when enabled by framer 104 is responsive to CLOCK to generate a 4 megahertz clock signal which is supplied to slip monitor and control 106, a 2 megahertz clock signal which is supplied to slip detector 107, a write address which is 9 bits and is supplied to slip detector 107 and elastic store RAM 102, a write enable signal is also supplied to enable RAM 102 to write in the data, and a parity indicator WEVEN which is supplied to a second input of Exclusive OR gate 103 and to slip maintenance circuit 108. Parity indicator WEVEN is employed in conjunction with Exclusive OR gate 103 to controllably scramble the parity of the incoming data in predetermined fashion in accordance with the invention. In this example, the parity of the incoming data is odd and is considered to be the normal parity. The incoming data parity scrambling is such that WEVEN causes Exclusive OR gate 103 to alternately generate even parity for 2 frames of incoming data and then odd parity for the next two frames of incoming data. The parity bit, i.e., bit 15, output from Exclusive OR gate 103 is supplied to RAM 102 to be written in with its corresponding time slot bits 0-14.

System clock and time slot generator 109 is supplied with a frame synchronization signal SSYNC and a system clock signal SCLOCK. In this example, the frame sync signal appears in time slot 8 and the system clock is 8 megahertz. The SSYNC and SCLOCK signals may be obtained from a local system to which the received data is being supplied, for example, a Digital Access and Cross-connect System. Generator 109 counts down, using appropriate counters in well known fashion, the 8 megahertz SCLOCK to generate 4 and 2 megahertz system clock signals which are synchronized to the system clock and not the line clock, a time slot 255 indication signal, 8 bits of a read address, and a read enable signal. The 4 megahertz signal is supplied to slip monitor and control 106. The time slot 255 indication signal is supplied to one input of Exclusive OR gate 110. The 8 bits of the read address are supplied to RAM 102, as is the read enable signal.

Slip monitor and control 106, slip detector 107, slip maintenance circuit 108 and Exclusive OR gate 110 are operative to generate a read parity indicator REVEN which is employed, in accordance with the invention, in conjunction with Exclusive OR gate 111 to controllably unscramble the output parity from elastic store RAM 102. An output from Exclusive OR gate 110 is the 9th and most significant read address bit (AS8T) and is supplied to slip detector 107 and elastic store RAM 102. The inverse of the 9th read address bit (AS8F) is supplied to slip maintenance circuit 108. The 9th read address bit is generated at a 4 kilohertz rate so that it changes state every second frame.

The output of Exclusive OR gate 111 is supplied to parity checker 112. The data output from elastic store 102 is utilized as desired.

To unscramble the read parity, in accordance with the invention, Exclusive OR gate 111 is supplied with the data parity bit, i.e., read bit 15, being read from from elastic store RAM 102 and signal REVEN from slip maintenance circuit 108. REVEN is employed to unscramble the parity from RAM 102, in accordance with the invention, to obtain the system parity which in this example is odd parity, as will be explained below. If the parity bit from RAM 102 is not unscrambled properly, that is to say, if the parity is not appropriately compensated when frame slips are declared, parity errors will result and be detected by parity checker 112. These errors indicate that either slip monitor and control 106, slip detector 107, slip maintenance circuit 108, or elastic store RAM 102 has failed.

FIG. 2 shows details of slip detector 107. As indicated above, slip detector 107 is employed to determine when a slip is imminent. A slip is imminent when the write address to RAM 102 is about to pass the read address or vice versa. Thus, a write catch read slip (WRSLIP) or a read catch write slip (RWSLIP) can occur. It is necessary to determine which of the slip conditions is occurring in order to properly unscramble the read parity. The slip decision is made in system time slot 255 and a slip is declared if the write address is in a predetermined relationship to the system time slot 255 and, hence, to the read address. In this example, a slip is declared if the write and read addresses are within one and a half time slots of each other. Therefore, slip detector 107 monitors the write address to determine if it is in time slot 254, 255 or 0 when the read address is in time slot 255. Then, slip detector 107 generates either a RWSLIP indication or a WRSLIP indication. The slip indications are supplied to slip monitor and control 106 and to slip maintenance circuit 108.

It is noted that in the following description the signals designated with a "T" are the "true" or normal outputs and the signals designated with a "F" are the "false" or inverse of the true outputs.

The RWSLIP and WRSLIP indicators are realized in the circuit of FIG. 2. To this end, the most significant line address bit AL8T and most significant read address bit AS8T from Exclusive OR gate 110 (FIG. 1) are supplied to Exclusive OR gate 201. Gate 201 generates outputs indicating whether the line address and read address pointers are in the same frame. The normal output from gate 201 is supplied to inputs of NOR gates 208 and 211, while an inverted output is supplied to an input of NOR gate 206 and to an inverting input of NOR gate 207. Line address bits AL0T through AL3T are supplied to OR gate 202 and line address bits AL4T through AL7T are supplied to OR gate 203. Outputs from gates 202 and 203 are supplied to inputs of NOR gate 206. Line clock signal LACK2 is the 2 megahertz line clock and is supplied to an input of OR gate 208, an inverting input of OR gate 207 and an inverting CK input of D type flip-flop 213. Line address bit AL0T and inverted line address bits AL1F through AL3F are supplied to inputs of OR gate 204, and inverted line address bits AL4F through AL7F are supplied to OR gate 205. Outputs from gates 204 and 205 are supplied to OR gate 209. The output from OR gate 209 is supplied to NOR gate 211 and to input D of flip flop 213. A logical 0 output from flip-flop 213 is indicative of time slot 255 and supplied to NOR gates 207 and 208. Outputs from NOR gates 206 and 207 are supplied to OR gate 210. An output from OR gate 210 is the read catch write indicator RWSLIP. Similarly, outputs from NOR gates 208 and 211 are supplied to OR gate 212. An output from OR gate 212 is the write catch read indicator WRSLIP.

In operation, OR gates 202 and 203 decode line address bits AL0T through AL7T to determine time slot 0. In this example, time slot 0 is indicated by the supplied address bits all being logical 0. NOR gate 206 yields a logical 1 output indicative of a read catch write slip in time slot 0 when AL8T does not equal AS8T. This logical 1 RWSLIP signal is supplied to OR gate 210.

NOR gate 207 is responsive to the signals supplied thereto to generate a logical 1 output indicative of a read catch write slip in time slot 255 which is supplied to OR gate 210.

Similarly, NOR gate 208 is responsive to the signals supplied thereto to generate a logical 1 output indicative of a write catch read slip in time slot 255 which is supplied to OR gate 212.

OR gates 204 and 205 decode line address bit AL0T and inverse line address bits AL1F through AL7F to determine time slot 254. This is indicated, in this example, when the supplied address bits are all logical 0. Outputs from gates 204 and 205 are supplied via OR gate 209 to NOR gate 211. NOR gate 211 yields a logical 1 output indicative of a write catch read slip in time slot 254 when AL8T equals AS8T. This logical 1 WRSLIP is supplied to OR gate 212.

Figure 3:
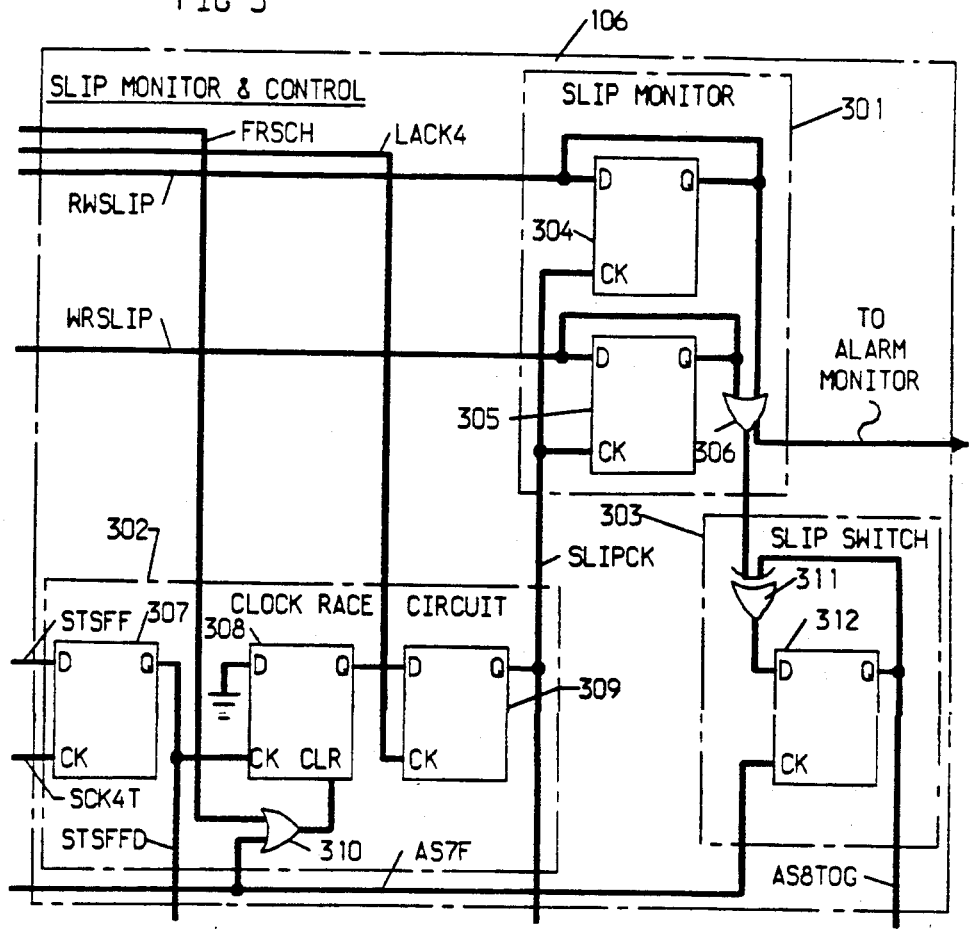
FIG. 3 shows details of the slip monitor and control used in FIG. 1.

FIG. 3 shows details of slip monitor and control 106 which includes slip monitor 301, clock race circuit 302, and slip switch 303. Slip monitor and control 106 is responsive to the RWSLIP and WRSLIP indicators from slip detector 107 to generate, in conjunction with Exclusive OR gate 110 (FIG. 1), the most significance system address bit AS8T. When an imminent slip is indicated by indicator RWSLIP or WRSLIP, system address bit AS8 is toggled to thereby force the line and system addresses 180 degrees out of phase with respect to one another. To this end, RWSLIP and WRSLIP are latched in flip-flops 304 and 305, respectively, of slip monitor 301. This latching occurs on a SLIPCK signal from clock race circuit 302. The outputs from flip-flops 304 and 305 are supplied via OR gate 306 to an alarm monitor and to slip switch 303.

Clock race circuit 302 includes D type flip-flops 307, 308 and 309, and OR gate 310. The system 4 megahertz clock signal SCK4T is supplied to the CK input of flip-flop 307, while the system time slot 255 indicator STSFF is supplied to input D. The output from flip flop 307 is supplied to the CK input of flip-flop 308 and to slip maintenance circuit 108. System address bit AS7F and the framing enable signal FRSCH from framer 104 (FIG. 1) are supplied via OR gate 310 to the CLR input of flip flop 308. The Q output of flip flop 308 is supplied to the D input of flip-flop 309, while the line clock 4 megahertz LACK4 signal is supplied to input CK. Output Q of flip-flop 309 is SLIPCK and is supplied to slip monitor 301 and slip maintenance circuit 108. Clock race circuit 302 is operative to generate SLIPCK which has a rising edge once per frame in system time slot 255. The rising edge occurs on the next rising edge of LACK4T occurring after the first rising edge of SCK4T in system time slot 255. At this time, it is assured that both the system and line addresses are stable.

Slip switch 303 includes Exclusive OR gate 311 and D type flip flop 312 configured as a toggle flip flop. The slip output from OR gate 306 of slip monitor 301 is supplied to one input of Exclusive OR gate 311, while the Q output (AS8TOG) of flip flop 312 is supplied to the other input. The output from Exclusive OR gate 311 is supplied to input D of flip flop 312. The inverse of system address bit AS7, namely, AS7F is supplied to the CK input of flip-flop 312. Slip switch 303 is operative to toggle output signal AS8TOG at the end of system time slot 255 when there is a slip. Signal AS8TOG is supplied to an input of Exclusive OR gate 110 (FIG. 1).

Figure 4:
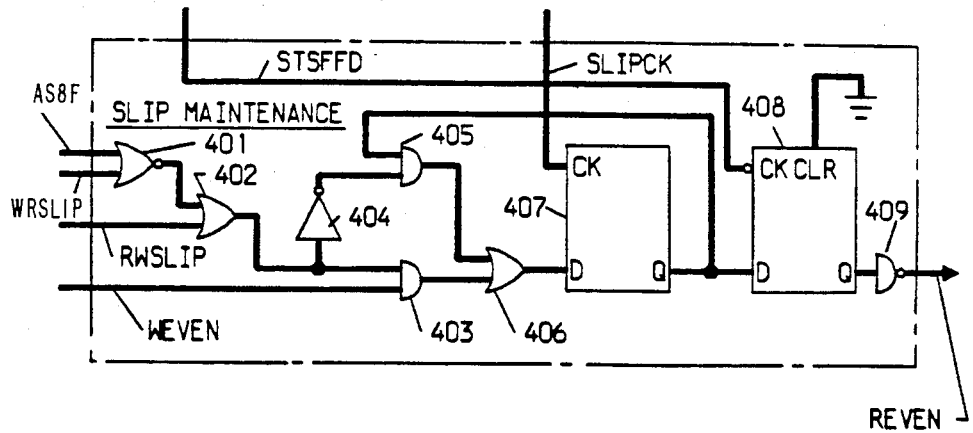
FIG. 4 depicts details of the slip maintenance circuit also used in the circuit of FIG. 1.

FIG. 4 shows details of slip maintenance circuit 108. As indicated above, the slip circuitry, i.e., slip detector 107 and slip monitor and control 106, and also the elastic store RAM 102 is maintained without the need for a service affecting exercise. To this end, the data is written to the elastic store RAM 102 (FIG. 1) with parity that changes, i.e., toggles, every two frames. Consequently, the two frames of data in the elastic store RAM 102 are written with the same parity. For example, the present two frames are written with even parity, then the next two frames are written with odd parity, and so forth. The slip maintenance circuit 108 keeps track of the parity and generates an appropriate signal REVEN to unscramble the read data parity. If, however, the slip circuitry fails or the RAM fails, read parity violations result in parity errors being detected by parity checker 112 (FIG. 1). Similarly, if slip maintenance circuit 108 fails, the read data from RAM 102 is not restored to the proper parity also resulting in parity violations.

Accordingly, WRSLIP from slip detector 107 is supplied to one input of NOR gate 401, while the inverse of the most significance system address bit, namely AS8F, from Exclusive OR gate 110 is supplied to the other input. The output from NOR gate 401 is supplied to one input of OR gate 402, while RWSLIP from slip detector 107 is supplied to the other input. An output from OR gate 402 is supplied to one input of AND gate 403 and via inverter 404 to one input of AND gate 405. Signal WEVEN from line clock and time slot generator 105 is supplied to a second input of AND gate 403. An output from AND gate 403 is supplied via OR gate 406 to the D input of flip-flop 407. Output Q from flip-flop 407 is supplied to a second input of AND gate 405 and to the D input of flip flop 408. SLIPCK from slip monitor and control 106 is supplied to the CK input of flip flop 407. Signal STSFFD also from slip monitor and control 106 is supplied to an inverted CK input of flip flop 408. Output Q from flip flop 408 is inverted via NAND gate 409 to generate REVEN. REVEN is supplied to Exclusive OR gate 111.

Slip maintenance circuit 108 is operative to generate REVEN in a manner to unscramble, in accordance with the invention, the RAM 102 read parity for frames when no slips are imminent and for compensating, in accordance with the invention, the read parity for frames in which a slip is declared. Accordingly, logic elements 401 through 406 are operative to select the output of flip-flop 407 to remain the same or become WEVEN in response to the states of signals WRSLIP, RWSLIP and AS8F. Flip-flop 407 is clocked by the rising edge of SLIPCK in system time slot 255. Any possible race conditions between the data and the clock signals is eliminated by using SLIPCK. Flip-flop 408 causes the output of flip-flop 407 to be clocked on the system clock rate in response to STSFFD. STSFFD has a falling edge in time slot 0.

As indicated above, the normal system parity is odd. Accordingly, slip maintenance circuit 108 is operative to generate REVEN in such a manner that Exclusive OR gate 111 (FIG. 1) generates this odd parity during frames in which no slips occur and during frames in which slips are declared. For frames in which there are no slips indicated, the read parity and write parity alternate between even and odd every two frames. Just before the beginning of the first frame in the two frame sequence, WRSLIP and RWSLIP are logical 0's and AS8F has been a logical 0 and WEVEN is clocked into flip-flop 407. Flip-flop 408 reclocks WEVEN at the system clock rate and NAND gate 409 yields REVEN. REVEN is supplied to Exclusive OR gate 111 to generate the correct parity for the first frame being read out of RAM 102. Just before the second frame in the two frame sequence WRSLIP and RWSLIP are again logical 0's while AS8F has been a logical 1. This causes flip flop 407 to be loaded with its present output. Thus, when flip-flop 408 is clocked, the output remains the same and REVEN from NAND gate 409 remains the same. Again, this causes Exclusive OR gate 111 to generate the desired odd parity for the second frame of data being read from RAM 102.

If a slip is declared during a frame, a frame of data is either deleted or reread. Consequently, REVEN must be compensated in order to cause Exclusive OR gate 111 to generate the desired system odd parity.

FIGS. 5 through 8 depict four scenarios in which a slip may occur and the action taken in adjusting the read address either forward a frame or back a frame.

FIG. 5 graphically illustrates the action taken when RWSLIP is a logical 1, i.e., a read catch write slip is imminent with system address bit AS8 having been a logical 1, i.e., AS8F having been a logical 0. This indicates that the second frame is being read and the read address pointer is bumped back to repeat reading the second frame. Consequently, the current value of REVEN is reloaded.

FIG. 6 graphically illustrates the action taken when WRSLIP is logical 1, i.e., a write read slip is imminent with system address bit AS8 having been a logical 1, i.e., AS8F having been a logical 0. This indicates that the second frame is being read and the read address pointer is bumped ahead to delete the first frame of data. Consequently, WEVEN is loaded in the slip maintenance circuit to yield the appropriate REVEN parity indication.

FIG. 7 graphically illustrates the action taken when RWSLIP is a logical 1, i.e., a read catch write slip is imminent, and bit AS8 has been a logical 0, i.e., AS8F has been a logical 1. This indicates that the first frame is being read and the read address pointer is bumped back to repeat reading the first frame. Consequently, the current value of REVEN is reloaded to obtain the appropriate parity.

FIG. 8 graphically illustrates the action taken when WRSLIP is a logical 1, i.e., a write catch read slip is imminent, and bit AS8 has been a logical 0, i.e., AS8F has been a logical 1. This indicates that the first frame is being read and the read address pointer is bumped ahead to delete the second frame of data. Consequently, WEVEN is loaded in the slip maintenance circuit to yield the appropriate REVEN parity indication.

The action taken in the slip maintenance circuit is summarized in the following table:

| RWSLIP | 0 | 0 | 1 | 1 |
|---|---|---|---|---|
| WRSLIP | 0 | 1 | 1 | 0 |
| AS8F | | | | |
| 1 | | R | W | W |
| 0 | | R | W | W | where R indicates reloading of REVEN and W indicates loading WEVEN.

It should be noted that the RWSLIP=1, WRSLIP=1 condition is not possible.

The above arrangement is only an example of an embodiment of the invention. It will be apparent to those skilled in the art that various changes in form and detail may be made without departing from the spirit or scope of the invention.

What is claimed is:

1. Elastic data store apparatus comprising, means having a plurality of storage locations for storing data therein, predetermined ones of said storage locations comprising a first data store and predetermined others of said storage locations comprising a second data store, means for alternately writing data into each of said first and second data stores, means for alternately reading data out from each of said first and second data stores in a manner such that the readout from one data store occurs substantially simultaneously with the write in of data into the other data store, means for comparing the read and write data store cycles and for generating at least a first control signal when the read and write data store cycles have drifted to a predetermined extent relative to each other indicative of a slip in the data, means responsive to said at least first control signal for causing said reading out means to skip reading a frame of stored data or to re-read a frame of stored data depending on the relative direction of said drift, means for scrambling normal system parity of the data being written into said data stores in a predetermined manner, means for controllably unscrambling parity of the data being read out of said data stores and being responsive to said at least first control signal for compensating said parity of the data being read out when a slip occurs so that the normal system parity is obtained, and means for detecting errors in the normal system parity of the data being read out of said stores.

2. Elastic data store apparatus comprising, means having a plurality of storage locations for storing data therein, predetermined ones of said storage locations comprising a first data store and predetermined others of said storage locations comprising a second data store, means for alternately writing data into each of said first and second data stores, means for alternately reading data out from each of said first and second data stores in a manner such that the readout from one data store occurs substantially simultaneously with the write-in of data into the other data store, means for comparing the read and write data store cycles and for generating a first control signal when the read and write data store cycles have drifted to a predetermined extent relative to each other and for detecting the relative direction of drift between read and write cycles and for generating a second control signal indicative of a first direction of drift when a frame of data is to be skipped from being read and a third control signal indicative of a second direction of drift when a frame of data is to be re-read, means responsive to said first, second and third control signals for causing said reading out means to skip reading a frame of stored data or to re-read a frame of stored data depending on the relative direction of said drift, means for scrambling normal system parity of the data being written into said data stores in a predetermined manner so that the parity of the data being written into said first and second data stores is alternately even parity for two frames and odd parity for two frames, means for controllably unscrambling parity of the data being read out of said data stores responsive to said first, second and third control signals for controllably compensating said read-out parity to generate the normal system parity, and means for detecting errors in the parity of the data being read out of said data stores.

3. The invention as defined in claim 1 wherein each of said data stores stores a frame of data and wherein said means for scrambling parity includes means for alternately causing the parity of the data being written into said first and second data stores to be even parity for two frames of data and then odd parity for two frames of data.

4. The invention as defined in claim 2 wherein each frame of data being written into said data stores has a predetermined number of time slots and each time slot has a predetermined number of bits including a parity bit, and wherein said scrambling means includes a first Exclusive OR gate supplied with said time slot parity bits of said time slots to be written in the data stores and a write parity control signal for generating write parity bits and means for generating said write parity control signal so that said write parity bits from said first Exclusive OR gate are alternately even parity for two frames of data and odd parity for two frames of data.

5. The invention as defined in claim 4 wherein each frame of data being read out of said data stores has a plurality of time slots and each time slot has a predetermined number of bits including a parity bit, and wherein said means for unscrambling includes a second Exclusive OR gate supplied with said read time slot parity bits and a read parity control signal for generating read parity bits and means responsive to said first, second and third control signals for generating said read parity control signal so that the parity of the read parity bits from said second Exclusive OR gate is a predetermined parity for each frame of data being read from said data stores.

6. The invention as defined in claim 5 wherein said unscrambling means further includes means responsive to said first, second and third control signals for controlling selecting as said read parity control signal the last previous value of the read parity control signal or the present value of the write parity control signal.

7. The invention as defined in claim 6 wherein said first control signal indicates which of the data stores was being read, said second control signal indicates that a write address catch read address slip is imminent and said third control signal indicates that a read address catch write address slip is imminent.

8. The invention as defined in claim 7 wherein said selecting means alternately selects as the read parity control signal the last previous value of said read parity control signal when said second and third control signals are indicative of no slip being imminent and said first control signal is indicative that the second data store is to be read, and selects as the read parity control signal the present value of said write parity control signal when said second and third control signals are indicative of no slip being imminent and said first control signal is indicative that said first data store is to be read.

9. The invention as defined in claim 8 wherein said selecting means further selects as said read parity control signal the last previous value of said read parity control signal when said third control signal indicates a slip is imminent.

10. The invention as defined in claim 9 wherein said selecting means further selects as said read parity control signal the present value of the write parity control signal when said second control signal indicates a slip is imminent.

11. The invention as defined in claim 10 wherein said predetermined relationship between said write address and said read address is one and one half time slots.

* * * * *